US011405392B2

(12) United States Patent
Saldanha et al.

(10) Patent No.: US 11,405,392 B2
(45) Date of Patent: Aug. 2, 2022

(54) SERVER AND SYSTEM FOR SECURE CONFIGURATION PUSH FOR DMZ PROXY CLIENTS

(71) Applicant: AVEVA Software, LLC, Lake Forest, CA (US)

(72) Inventors: Ryan Benedict Saldanha, Anaheim, CA (US); Vinay T. Kamath, Rancho Santa Margarita, CA (US); Scott Alan Savino, Lake Forest, CA (US); Elliott Scott Middleton, Jr., Tyler, TX (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 58 days.

(21) Appl. No.: 16/566,738

(22) Filed: Sep. 10, 2019

(65) Prior Publication Data
US 2020/0084212 A1    Mar. 12, 2020

Related U.S. Application Data

(60) Provisional application No. 62/729,945, filed on Sep. 11, 2018.

(51) Int. Cl.
*G06F 7/04*         (2006.01)
*G06F 15/16*        (2006.01)
(Continued)

(52) U.S. Cl.
CPC ...... *H04L 63/0884* (2013.01); *H04L 63/0209* (2013.01); *H04L 63/0281* (2013.01); *H04L 63/101* (2013.01); *H04L 63/205* (2013.01)

(58) Field of Classification Search
CPC ............. H04L 63/0884; H04L 63/0281; H04L 63/0209; H04L 63/101; H04L 63/205
See application file for complete search history.

(56) References Cited

U.S. PATENT DOCUMENTS 6,604,143 B1 * 8/2003 Nagar ................. H04L 63/0227
709/229
6,718,388 B1 * 4/2004 Yarborough ........ H04L 63/0227
709/217
(Continued)

FOREIGN PATENT DOCUMENTS

EP              1086426 B1     11/2006
KR     10-2016-0005113 A       1/2016

OTHER PUBLICATIONS

International Search Report and Written Opinion for International Application No. PCT/US2019/050479, dated Feb. 12, 2020, 10 pages.

*Primary Examiner* — Amie C. Lin
(74) *Attorney, Agent, or Firm* — Greenberg Traurig, LLP

(57) ABSTRACT

A server system can include an internal computer network including at least one client server configured to establish a data transfer connection to an external computer network, and at least one proxy server system positioned between the internal computer network and the external computer network. The proxy server system can include a proxy server positioned between a first firewall and a second firewall, where the first firewall is positioned between the first proxy server and the internal computer network, and the second firewall is positioned between the proxy server and the external computer network. The server system can develop and maintain a proxy server system that includes a whitelist of sites deemed necessary and/or desirable for system operation. The whitelist can be updated as a user works with and uses the system. Such updates can take place continuously in real or near-real time or periodically as frequently as desired. A single party can be the only entity that can update the whitelist, ensuring the whitelist contains all required sites. Whitelist updates can be automatically delivered to all proxy instances as the whitelist changes over time.

18 Claims, 3 Drawing Sheets

(51) Int. Cl.
*G06F 17/30* (2006.01)
*H04L 29/06* (2006.01)
*H04L 9/40* (2022.01)

(56) References Cited

U.S. PATENT DOCUMENTS

| | | | |
|---|---|---|---|
| 2005/0060399 A1* | 3/2005 | Murakami | H04L 67/02 709/223 |
| 2010/0299742 A1* | 11/2010 | Declety | H04L 63/0209 726/13 |
| 2014/0115688 A1 | 4/2014 | Zuk et al. | |
| 2015/0334046 A1* | 11/2015 | Varji Siddappa | H04L 67/10 709/225 |
| 2016/0088022 A1* | 3/2016 | Handa | H04L 63/0209 726/1 |
| 2018/0270202 A1* | 9/2018 | Li | H04L 63/0263 |

\* cited by examiner

SERVER AND SYSTEM FOR SECURE CONFIGURATION PUSH FOR DMZ PROXY CLIENTS

CROSS-REFERENCE TO RELATED APPLICATIONS

This application claims the benefit of and priority to U.S. Provisional Patent Application No. 62/729,945, filed Sep. 11, 2018, entitled, "SYSTEM FOR SECURE CONFIGURATION PUSH FOR DMZ PROXY CLIENTS SYSTEM AND METHOD", the entire contents of which are incorporated herein by reference.

BACKGROUND

Industrial control systems must be protected from attack by computer viruses and other malware and from malicious users. Most best practices isolate these systems from both internal business networks and the Internet with a network segmented demilitarized zone ("DMZ"). While this isolation protects the systems, it also traps information that is valuable to the business and operational teams within that same network. Some other solutions for accessing this trapped information either burden the user with complex access procedures, or reduce the security of the control system network.

Accordingly, methods are needed that securely update the configuration of secure proxies running on the DMZ of users that connect to cloud-based systems such as AVEVA Group plc's "Wonderware® Online Cloud" software in order to store and access process data and events. A secure proxy can allow information to flow from control systems to more accessible systems, without exposing systems or users to new attack vectors.

SUMMARY OF THE INVENTION

Some embodiments include a server system comprising an internal computer network including at least one client server configured to establish a data transfer connection to an external computer network, and a proxy server system positioned between the internal computer network and the external computer network. In some embodiments, the proxy server system includes a first proxy server positioned between a first firewall and a second firewall, where the first firewall is positioned between the first proxy server and the internal computer network, and the second firewall is positioned between the first proxy server and the external computer network.

In some embodiments, the data transfer connection is a secure connection. In some embodiments, the proxy server system is a demilitarized zone proxy server system, where the first proxy server comprises a demilitarized zone proxy server. In some embodiments, the demilitarized zone proxy server is digitally signed as a configuration using specific certificates. In some embodiments, the configuration is stored locally.

Some embodiments further comprise a second proxy server system positioned between the internal computer network and the external computer network, where the second proxy server system includes a second proxy server positioned between a third firewall and a fourth firewall. Further, in some embodiments, the third firewall is positioned between the second proxy server and the internal computer network, and the fourth firewall is positioned between the second proxy server and the external computer network.

Some embodiments further comprise logic, executable by one or more processors of the server system that can operate to chain the first proxy server to the second proxy server. In some embodiments, the second proxy server system is a demilitarized zone proxy server system, where the second proxy server comprises a demilitarized zone proxy server.

In some embodiments, the proxy server system is configured to establish a secure connection to at least one external server. In some embodiments, the at least one external server comprises a cloud-based server. In some further embodiments, the proxy server system is configured to prevent connection to at least one other server.

In some embodiments, the second proxy server system is configured to establish a secure connection to at least one external server. In some further embodiments, the second proxy server system is configured to prevent connection to at least one other server.

DETAILED DESCRIPTION

Figure 1:
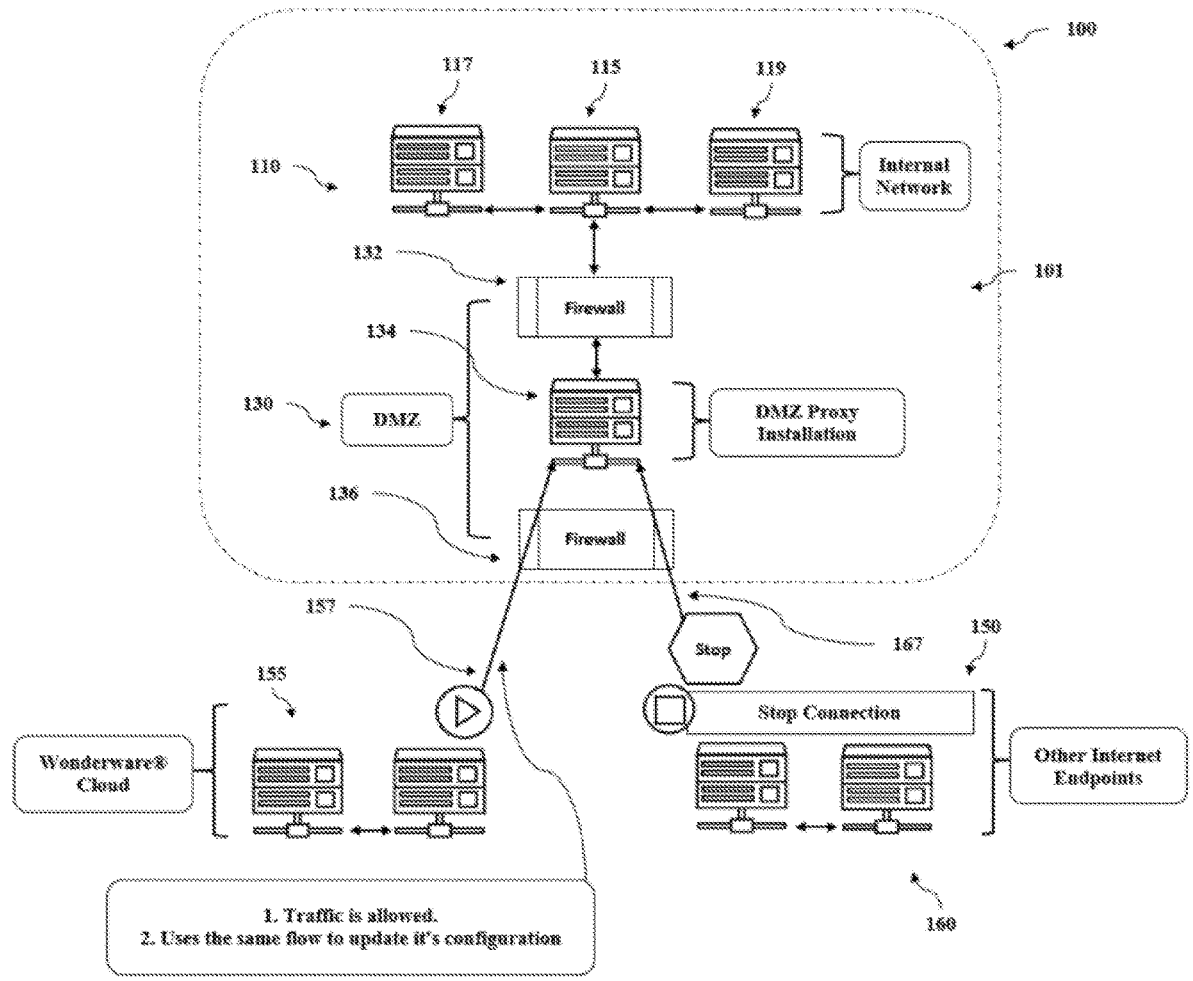
FIG. 1 illustrates a system architecture in accordance with some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention herein generally describe non-conventional approaches for server systems and methods for establishing secure data transfer connections between computer networks that are not well-known, and further, are not taught or suggested by any known conventional methods or systems. Moreover, the specific functional features are a significant technological improvement over conventional methods and systems, including at least the operation and functioning of a computing system that are technological improvements. These technological improvements include one or more aspects of the systems and method described herein that describe the specifics of how a machine operates, which the Federal Circuit makes clear is the essence of statutory subject matter.

One or more of the embodiments described herein include functional limitations that cooperate in an ordered combination to transform the operation of a data repository in a way that improves the problem of data storage and updating of databases that previously existed. In particular, some embodiments described herein include system and methods for managing single or multiple content data items across disparate sources or applications that create a problem for users of such systems and services, and where maintaining reliable control over distributed information is difficult or impossible.

The description herein further describes some embodiments that provide novel features that improve the performance of communication and software, systems and servers by providing automated functionality that effectively and more efficiently manages resources and asset data for a user in a way that cannot effectively be done manually. Therefore, the person of ordinary skill can easily recognize that these functions provide the automated functionality, as described herein, in a manner that is not well-known, and certainly not conventional. As such, the embodiments of the invention described herein are not directed to an abstract idea and further provide significantly more tangible innovation. Moreover, the functionalities described herein were not imaginable in previously-existing computing systems, and did not exist until some embodiments of the invention solved the technical problem described earlier.

Some embodiments of the invention provide a system and method to securely update the configuration of one or more secure proxies running on the DMZs of customers that connect to AVEVA Group plc's Wonderware® Online Cloud to store and access process data and events.

Some embodiments of the invention include a system and method for at least one secure proxy that allows information to flow from one or more control systems to more accessible systems without exposing the system or any coupled systems or users to new attack vectors.

Some embodiments of the invention comprise systems and methods (e.g., such as one or more software applications or sequences of code executed by one or more processors of the system) that can operate to chain two or more proxies together.

In some embodiments, the systems and methods described herein can eliminate or reduce the need for customers to manually update one or more configurations each time a new machine is added or deleted. In some instances, this can save countless hours of work as well as system downtime.

Some embodiments develop and maintain a proxy server system that comprises a "whitelist" of sites deemed necessary and/or desirable for system operation. In some embodiments, the whitelist is updated as a user works with and uses the system. Such updates can take place continuously in real or near-real time or periodically as frequently as desired. In some embodiments, a single party is the only entity that can update the whitelist, ensuring the whitelist contains all required sites (so failures do not occur because a user missed a required site), but only such requires sites, thereby ensuring secure and accurate content. In some embodiments, proxy server system whitelist updates are automatically delivered to all proxy instances, and no blacklists are maintained or updated by the proxy server system.

In some embodiments, updates are automatically delivered to all proxy instances as the whitelist changes over time. Some embodiments protect the whitelist from tampering (whether malicious or accidental) that could endanger critical infrastructure/operations. Further some embodiments can be used in tandem with existing corporate network protections.

In some embodiments of the invention, any system or user configuration can be digitally-signed using specific certificates to prevent tampering and exploitation in-transit, and/or after being saved on a local system or other coupled system. In some embodiments of the invention, the configuration can be stored locally for subsequent use.

In some embodiments of the invention, any system, method, or user configuration described herein can prevent unauthorized access to non-AVEVA Insight™ endpoints as well as endpoints in AVEVA E3D Insight™ software.

In some embodiments of the invention, any system, method, or user configuration described herein can prevent malware from uploading sensitive control data to non-AVEVA endpoints. Some embodiments protect against "bot" malware being able to reach command and control endpoints.

AVEVA, the AVEVA logos and AVEVA product names (including Wonderware®) are trademarks or registered trademarks of AVEVA Group plc and/or its affiliates.

Figure 2:
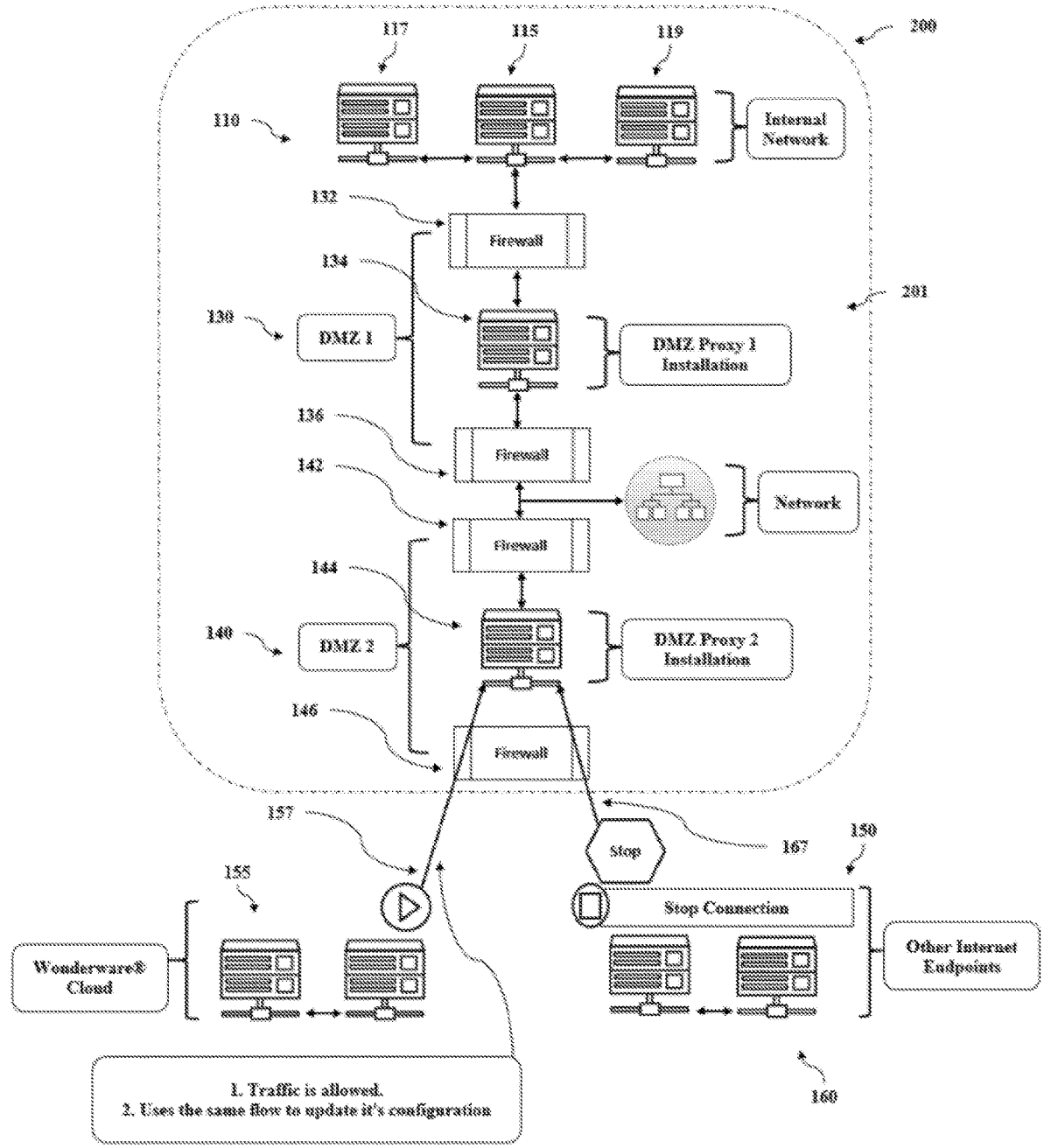
FIG. 2 illustrates a system architecture in accordance with some further embodiments of the invention.

FIG. 1 illustrates a system architecture in accordance with some embodiments of the invention, and FIG. 2 illustrates a system architecture in accordance with some further embodiments of the invention. As shown in FIG. 1, in some embodiments, the system architecture can include a DMZ proxy installed between firewalls between the internal computer network and external to the internal computer network. Another non-limiting embodiment is shown in FIG. 2, illustrating a system architecture with two DMZ proxy architectures including a first DMZ proxy installed between firewalls between the internal computer network and external to the internal computer network, and a second DMZ proxy installed between firewalls between the internal computer network and external to the internal computer network. In some embodiments, the first DMZ proxy is installed between firewalls between the internal computer network and a firewall of the second DMZ proxy. Further, the second DMZ proxy can be installed between firewalls between the firewall of the first DMZ proxy and a firewall of the second DMZ proxy. Further details of the architectures of FIGS. 1-2 follow in the descriptions below.

Some embodiments include system 100 that include internal system 101 and a coupled or configured to be coupled external system 150 that enables a secure update of the configuration of secure proxies running on a DMZ of client systems that connect to external systems such as Wonderware® online cloud and/or other Internet endpoints. In some embodiments, the DMZ can capture messages and data destined for external servers and forward the messages and/or data through a firewall.

For example, some embodiments include one or more client servers 110 of an internal computer network. In the non-limiting embodiment of FIG. 1, the client servers 110 can include server 115 and/or server 117, and/or server 119. Other embodiments can include more or fewer numbers of client servers. In some embodiments, the client servers 110 can be configured to be communicatively coupled to the external system 150 via a demilitarized zone (DMZ) proxy server system 130. For example, in some embodiments, at least one of the servers of the client servers 110 establish a connection through the DMZ system 130 using a connection through a first firewall 132 to a DMZ proxy server 134. In some embodiments, the DMZ proxy server 134 can intercept data communications between server 115 and/or server 117, and/or server 119 and the external system 150, and established one or more secure connections to the external system 150 through second firewall 136.

In the non-limiting example of FIG. 1, the external system 150 can comprise cloud servers 155 and/or external servers 160. In some embodiments, the DMZ proxy server 134 can enable one or more secure connections to the external system 150 through second firewall 136, including, but not limited to, first secure connection 157 to cloud servers 155. In some embodiments, the configurations or requests to establish a second secure connection 167 to external servers 160 can be stopped and/or controlled by the DMZ proxy server 134.

Regarding FIG. 2, in some embodiments, the internal system 201 can include the architecture of internal system 101 with a second DMZ proxy server and firewall combination coupled between the DMZ proxy server 134 and the external system 150. For example, some embodiments include DMZ system 140 with a third firewall 142, fourth firewall 146, and a DMZ proxy server 144 positioned between the third firewall 142 and fourth firewall 146. In some embodiments, the internal system 201 can establish or maintain one or more secure connections to the external system 150. For example, some embodiments include the first secure connection 157 being established or maintained with the DMZ proxy server 144 through the fourth firewall 146, and/or a prevention or control of a second secure connection 167 through the fourth firewall 146 by the DMZ proxy server 144.

In some embodiments, the systems shown in FIGS. 1 and/or 2 eliminate or reduce the need for customers to manually update one or more configurations when additional servers 110 are added or removed. In some embodiments of the invention, any system or user configuration can be digitally-signed using specific certificates to prevent tampering and exploitation or user error in-transit through first secure connection 157, and/or after being saved on a local system or other coupled system. In some embodiments of the invention, the configuration can be stored locally for subsequent use.

Figure 3:
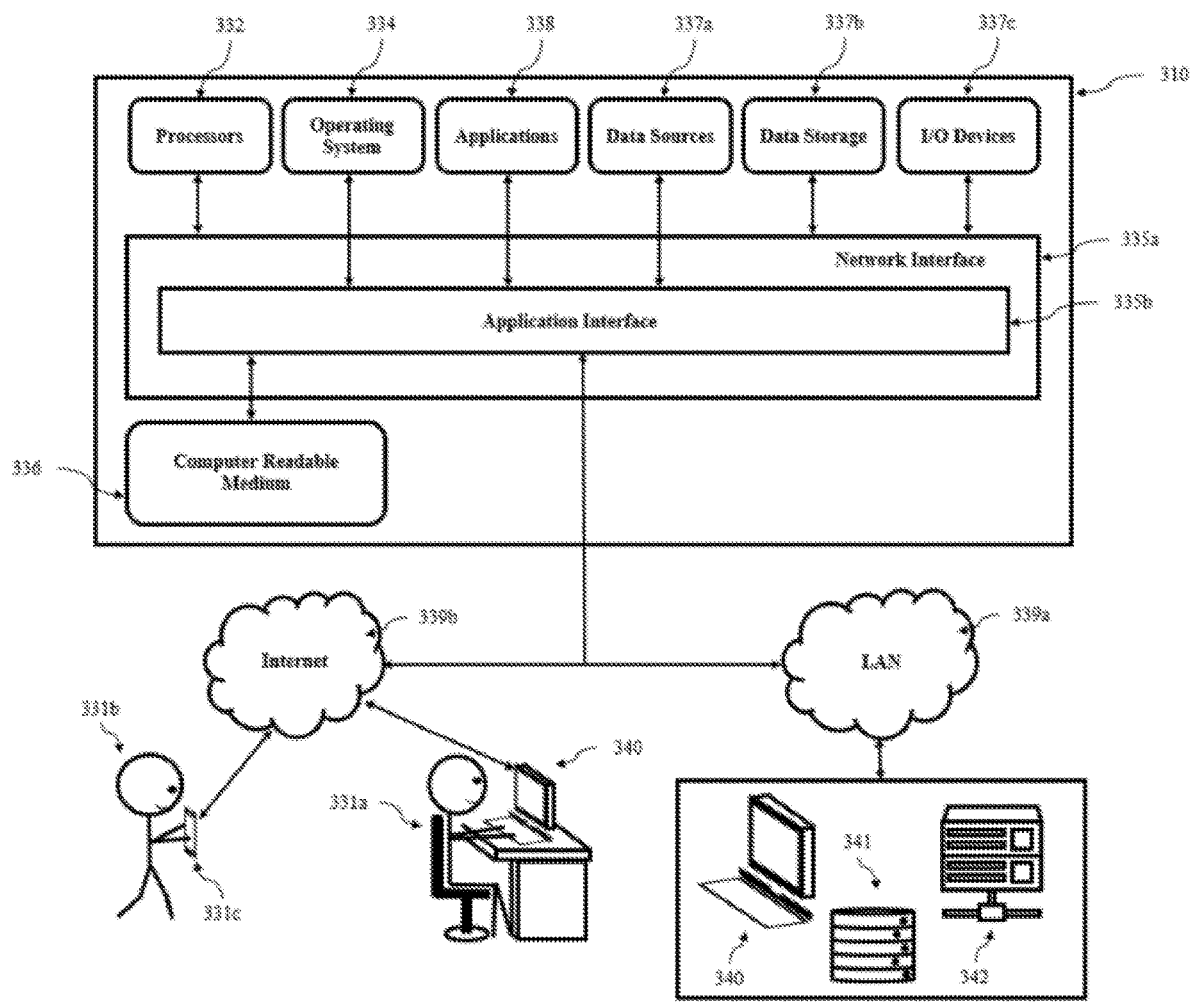
FIG. 3 illustrates a computer system enabling or comprising the system architecture of FIGS. 1-2 in accordance with some embodiments of the invention.

Referring to FIG. 3, in some embodiments, the computer system 310 can include and/or operate and/or process computer-executable code of one or more of the above-mentioned software modules and/or systems. Further, in some embodiments, the computer system 310 can operate and/or display information within one or more graphical user interfaces of the systems of FIGS. 1-2. In some embodiments, the computer system 310 can comprise the cloud and/or can be coupled to one or more cloud-based server systems. In some embodiments, the system 310 can comprise at least one computing device 330 including at least one processor 332. In some embodiments, the at least one processor 332 can include a processor residing in, or coupled to, one or more server platforms. In some embodiments, the system 310 can include a network interface 335a and an application interface 335b coupled to the least one processor 332 capable of processing at least one operating system 334. Further, in some embodiments, the interfaces 335a, 335b coupled to at least one processor 332 can be configured to process one or more of the software modules 338 (e.g., such as enterprise applications). In some embodiments, the software modules 338 can include server-based software, and can operate to host at least one user account and/or at least one client account, and operating to transfer data between one or more of these accounts using the at least one processor 332.

With the above embodiments in mind, it should be understood that the invention can employ various computer-implemented operations involving data stored in computer systems. Moreover, the above-described databases and models described throughout can store analytical models and other data on computer-readable storage media within the system 310 and on computer-readable storage media coupled to the system 310. In addition, the above-described applications of the system can be stored on computer-readable storage media within the system 310 and on computer-readable storage media coupled to the system 310. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 310 can comprise at least one computer readable medium 336 coupled to at least one data source 337a, and/or at least one data storage device 337b, and/or at least one input/output device 337c. In some embodiments, the invention can be embodied as computer readable code on a computer readable medium 336. In some embodiments, the computer readable medium 336 can be any data storage device that can store data, which can thereafter be read by a computer system (such as the system 310). In some embodiments, the computer readable medium 336 can be any physical or material medium that can be used to tangibly store the desired information or data or instructions and which can be accessed by a computer or processor 332. In some embodiments, the computer readable medium 336 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 336 can transmit or carry instructions to a computer 340 and/or at least one user 331, including a router, private or public network, or other transmission device or channel, both wired and wireless. In some embodiments, the software modules 338 can be configured to send and receive data from a database (e.g., from a computer readable medium 336 including data sources 337a and data storage 337b that can comprise a database), and data can be received by the software modules 338 from at least one other source. In some embodiments, at least one of the software modules 338 can be configured within the system to output data to at least one user 331 via at least one graphical user interface rendered on at least one digital display.

In some embodiments of the invention, the computer readable medium 336 can be distributed over a conventional computer network via the network interface 335a where the system embodied by the computer readable code can be stored and executed in a distributed fashion. For example, in some embodiments, one or more components of the system 310 can be coupled to send and/or receive data through a local area network ("LAN") 339*a* and/or an internet coupled network 339*b* (e.g., such as a wireless internet). In some further embodiments, the networks 339*a*, 339*b* can include wide area networks ("WAN"), direct connections (e.g., through a universal serial bus port), or other forms of computer-readable media 336, or any combination thereof.

In some embodiments, components of the networks 339*a*, 339*b* can include any number of user devices such as personal computers including for example desktop computers, and/or laptop computers, or any fixed, generally non-mobile internet appliances coupled through the LAN 339*a*. For example, some embodiments include computer 340 coupled through the LAN 339*a* that can be configured for any type of user including an administrator. Other embodiments can include personal computers coupled through network 339*b*. In some further embodiments, one or more components of the system 310 can be coupled to send or receive data through an internet network (e.g., such as network 339*b*). For example, some embodiments include at least one user 331 coupled wirelessly and accessing one or more software modules of the system including at least one enterprise application 338 via an input and output ("I/O") device 337*c*. In some other embodiments, the system 310 can enable at least one user 331 to be coupled to access enterprise applications 338 via an I/O device 337*c* through LAN 339*a*. In some embodiments, the user 331 can comprise a user 331*a* coupled to the system 310 using a desktop computer, and/or laptop computers, or any fixed, generally non-mobile internet appliances coupled through the internet 339*b*. In some further embodiments, the user 331 can comprise a mobile user 331*b* coupled to the system 310. In some embodiments, the user 331*b* can use any mobile computing device 331*c* to wireless coupled to the system 310, including, but not limited to, personal digital assistants, and/or cellular phones, mobile phones, or smart phones, and/or pagers, and/or digital tablets, and/or fixed or mobile internet appliances.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

For the purposes of this disclosure the term "server" should be understood to refer to a service point which provides processing, database, and communication facilities. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as a Microsoft® Windows® Server, Mac OS X, Unix, Linux, and/or any other conventional operating system. Microsoft® and Windows® are registered trademarks of Microsoft Corporation, Redmond, Wash.

For the purposes of this disclosure a "network" should be understood to refer to a network that may couple devices so that communications may be exchanged, such as between a server and a client device, peer to peer communications, or other types of devices, including between wireless devices coupled via a wireless network, for example. A network may also include mass storage, such as network attached storage (NAS), a storage area network (SAN), or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, "Integrated Services Digital Networks" (ISDNs), "Digital Subscriber Lines" (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple user or client devices with a network. A wireless network may employ stand-alone ad-hoc networks, mesh networks, wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including "Long Term Evolution" (LTE), WLAN, wireless router (WR) mesh, or 2nd, 3rd, 4th, or 5th generation (2G, 3G, 4G, or 5G) cellular technology, or the like. Network access technologies may enable wide area coverage for devices, such as client devices with varying degrees of mobility, for example. For example, a network may enable RF or wireless type communication via one or more network access technologies, such as "Global System for Mobile communication" (GSM), "Universal Mobile Telecommunications System" (UMTS), "General Packet Radio Services" (GPRS), "Enhanced Data GSM Environment" (EDGE), 3GPP LTE, LTE Advanced, "Wideband Code Division Multiple Access" (WCDMA), Bluetooth®, 802.11b/g/n, or the like. A wireless network may include virtually any type of wireless communication mechanism by which signals may be communicated between devices, such as a client device or a computing device, between or within a network, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a near field communication (NFC) device, a personal digital assistant (PDA), a handheld computer, a tablet computer, a phablet, a laptop computer, a set top box, a wearable computer, an integrated device combining various features, such as features of the forgoing devices, or the like.

A client device may vary in terms of capabilities or features, and claimed subject matter is intended to cover a wide range of potential variations. A web-enabled fixed or mobile device may include a browser application that is configured to receive and to send web pages, web-based messages, and the like. The browser application may be configured to receive and display graphics, text, multimedia, and the like, employing virtually any conventional web-based language.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the description herein.

The invention claimed is:
1. A server system comprising:
at least one computer comprising at least one processor and at least one computer readable medium, the at least one computer readable medium comprising a physical or material medium configured to store instructions that when executed by the at least one computer implement:
an internal computer network including at least one client server configured to establish a data transfer connection to an external computer network, and
a first proxy server system positioned between the internal computer network and the external computer network;
wherein the first proxy server system includes a first proxy server positioned between a first firewall and a second firewall;
wherein the first firewall is positioned between the first proxy server and the internal computer network;
wherein the second firewall is positioned between the first proxy server and the external computer network; and
a second proxy server system positioned between the first proxy server system and the external computer network;
wherein the second proxy server system includes a second proxy server positioned between a third firewall and a fourth firewall;
wherein the third firewall is positioned between the second proxy server and the second firewall;
wherein the fourth firewall is positioned between the second proxy server and the external computer network; and wherein a network between the second firewall and the third firewall is isolated from the internal computer network and the external computer network.

2. The server system of claim 1,
wherein the data transfer connection is a secure connection.

3. The server system of claim 1,
wherein the first proxy server comprises a demilitarized zone proxy server.

4. The server system of claim 3,
wherein the demilitarized zone proxy server is digitally signed as a configuration using specific certificates.

5. The server system of claim 4, wherein the configuration is stored locally.

6. The server system of claim 1,
further comprising instructions that when implemented by the at least one computer cause the at least one processor to chain the first proxy server to the second proxy server.

7. The server system of claim 6,
wherein the second proxy server comprises a demilitarized zone proxy server.

8. The server system of claim 1,
wherein the first proxy server system is configured to establish a secure connection to the external computer network.

9. The server system of claim 8,
wherein the at least one external server comprises a cloud-based server.

10. The server system of claim 8,
wherein the second proxy server system is configured to prevent connection to at least one other server.

11. The server system of claim 1,
wherein the second proxy server system is configured to establish a secure connection to the external computer network.

12. The server system of claim 1,
wherein the second proxy server system is configured to prevent connection to at least one other server.

13. The server system of claim 1,
wherein the first proxy server comprises a whitelist of sites which are approved for data transfer connection;
wherein the whitelist is maintained and updated by a single party.

14. The server system of claim 13,
wherein the whitelist contains only websites deemed essential by the single party.

15. The server system of claim 13,
wherein updates to the whitelist are automatically delivered to all proxy instances.

16. The server system of claim 13,
wherein the whitelist is maintained and updated by a single party.

17. The server system of claim 16,
wherein the whitelist contains only websites deemed essential by the single party.

18. The server system of claim 13,
wherein whitelist updates are automatically delivered to all proxy instances; and
wherein no blacklists are maintained or updated.

\* \* \* \* \*